United States Patent [19]

Buschor

[11] 4,448,820
[45] May 15, 1984

[54] SPRAY COATING CONTROL SYSTEM

[75] Inventor: Karl Buschor, St.Gallen, Switzerland

[73] Assignee: Ransburg-Gema AG, Switzerland

[21] Appl. No.: 447,299

[22] Filed: Dec. 6, 1982

[30] Foreign Application Priority Data

Dec. 8, 1981 [DE] Fed. Rep. of Germany ....... 3148539

[51] Int. Cl.³ .......................... B05D 1/02; B05B 12/02
[52] U.S. Cl. .................................... 427/424; 118/663;
118/668; 118/679; 118/708; 118/712; 198/502;
198/810
[58] Field of Search ............... 118/663, 668, 679, 708,
118/712, 715; 198/502, 810; 427/424

[56] References Cited

U.S. PATENT DOCUMENTS

| 2,794,538 | 6/1957 | Schenk | 198/502 X |
| 3,963,115 | 6/1976 | Teske | 198/502 X |
| 4,357,900 | 11/1982 | Buschor | 118/679 X |

Primary Examiner—Shrive P. Beck
Attorney, Agent, or Firm—Ostrolenk, Faber, Gerb & Soffen

[57] ABSTRACT

A spray-coating control system for automatically spraying articles moved through a spray-coating region by a conveyor is disclosed. A pulse generating means such as a shaft encoder, which is connected to the conveyor, generates conveyor movement pulses in response to movement of the conveyor. These pulses are processed by a timing signal generating circuit to produce timing signals at a fraction of the frequency of the conveyor movement pulses and in synchronism therewith. The timing signals are used to control the operation of the sprayer synchronously with the movement of the articles through the spray-coating region. Hangers for suspending the articles from the conveyor are nominally equally spaced along the conveyor. These hangers can, however, be positioned at varying distances from one another along the conveyor due to stretching of local sections of the conveyor. In order for the timing signals to be generated at a frequency representative of the true movement of the hangers, and therefore the true movement of the articles to be sprayed, even when the distance between hangers varies, the hangers serve as signal elements and are sensed by a hanger detector which generates a hanger detection signal generated every time a hanger is sensed. Each of these hanger detection signals resets the timing signal generating circuit which then begins to operate in response to pulses from the pulse generating means and generates a timing signal each time a first predetermined number of pulses from the pulse generating means has been received, until a second predetermined number of timing signals has been received.

17 Claims, 6 Drawing Figures

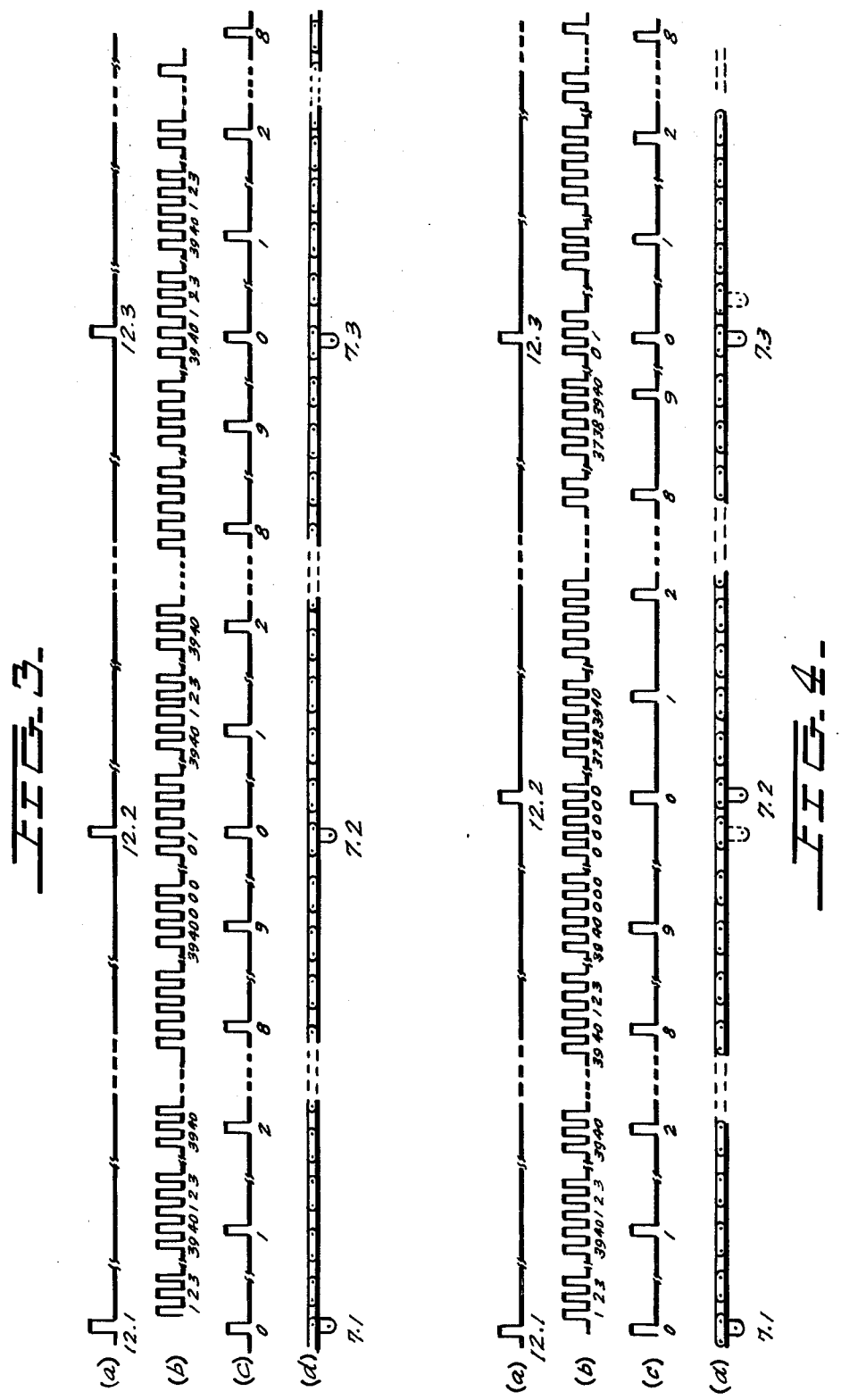

SPRAY COATING CONTROL SYSTEM

BACKGROUND OF THE INVENTION

The present invention relates to a spray coating control system including a method and apparatus for controlling the spraying of articles by an automatically controlled sprayer as those articles are carried by a conveyor through a spray area.

In such a control system, a spray control circuit turns the sprayer on and off at the correct moments and moves it through the spray area in synchronism with the article to be sprayed. In typical prior art systems, the control circuit may also determine the amount of coating material sprayed per unit of time and may control a device that charges the coating material electrostatically. Such control systems advantageously incorporate a freely programmable microprocessor with a memory that will store various programs for different coating procedures. Exemplary of such systems are British Pat. No. 2,013,934 and U.S. Pat. No. 4,357,900.

In order for the control system to properly synchronize the operation of the sprayer with the movement of the article to be coated, it must know the position of the article as it moves through the spraying chamber. To this end, the control system typically receives timing signals indicative of the speed of movement of the article through the spray area. The timing signals are typically generated by using a pulse generator which generates pulses in response to the motion of the conveyor at a point remote from the spray area. If an initial position of the article is known, and if the length of the conveyor remains constant, these pulses will provide an accurate indication of the instantaneous position of the article to be sprayed as it moved through the spray area.

In actual practice, differences in tolerance, especially those created by the longitudinal expansion of the conveyor, will cause alterations in the dimensions of sections of the conveyor. This will create differences between the actual position of an article as it moved through the spray area by the conveyor and an apparent position of the article determined by the timing signals. Such differences in actual and apparent positions will give rise to errors in the process by which the operation of the sprayer is synchronized with the movement of the article through the spray area. As a result, coating material may be sprayed to one side of the article, areas of the article which should be coated may be missed, etc.

Conveyors employed in conjunction with known spray-coating systems travel at a rate of approximately 6 meters per minute. When using a microprocessor based control circuit to control the operation of the sprayer, approximately 100 ms must be provided for the microprocessor to process a single control step and to prepare to accept a new control step. Therefore, the control circuit can only respond to timing signals (indicative of the speed of the conveyor) having a frequency of no more than about 600 signals per minute.

To allow for some margin of error at 6 meters per minute and to permit operation at a conveyor rate as high as 12 meters per minute, one timing signal should be produced for every two centimeters of conveyor travel. Fewer timing signals per section of conveyor travel would provide too low a resolution to permit accurate coating of the articles because alterations in the coating process could not take place accurately enough with respect to the time taken for the articles to move through the spray area. While it is possible to generate timing signals at high rates in response to the motion of the conveyor or the means for driving the conveyor (i.e. a drive motor) to provide high resolution information concerning the speed at which an article is moving through the spray area, the rate of such signals is too high to be utilized by a microprocessor based control circuit.

SUMMARY OF THE INVENTION

The present invention is intended to insure that the operation of an automatic sprayer is accurately synchronized with the actual movement of the article through a spray-coating region. According to the invention, a timing signal generating circuit generates timing signals in accordance with the frequency of conveyor movement pulses which are indicative of the speed of movement by the conveyor at a point which is remote from the spray-coating region. Since these pulses will not accurately reflect the position of the article as it is moved through the spray-coating region when the length of individual conveyor sections vary, the phase of the timing signals is periodically adjusted to reflect the actual position of the article. This is accomplished by adjusting the phase of the timing signals as a function of bracket position signals which are generated in response to the movement of successive brackets past a predetermined location along the conveyor path.

A plurality of brackets are mounted at nominally equal intervals along the conveyor. Each of the articles to be spray coated is carried by a hanger which is suspended from a bracket. Bracket detection means are provided to detect the presence of one of the brackets at the above mentioned predetermined point along the path and for producing a bracket position signal in response thereto. As described above, the pulse generating means generates conveyor movement pulses in synchronization with the speed of movement of the conveyor. These pulses are supplied to a timing signal generating circuit for producing timing signals (preferably pulses) at a frequency equal to a fraction of the frequency of the conveyor movement pulses and in synchronism with those pulses. In the preferred embodiment, the timing signal generator means produces a timing signal whenever a first predetermined number of the conveyor movement pulses have been generated. Once a second predetermined number of timing signals (preferably corresponding to one less than the number of timing signals which correspond to the nominal distance between brackets) have been generated, the further gen-eration of timing signals is inhibited until the bracket detector means generates another bracket position signal. The timing signal generator means responds to the bracket position signal by generating another timing signal and reinitiating the counting of conveyor movement pulses. In this manner, the phase of the timing signals are adjusted to reflect the actual position of the article as it moves through the spray area. The timing signals are applied to a spray control means which operates the automatic sprayer in response thereto.

An article detection means is also provided for detecting the presence of an article on the conveyor as its front edge reaches a point upstream of the spray area and for generating an initial position signal in response thereto.

In accordance with an additional feature of the invention, coding members which are spatially associated with the brackets on the conveyor, for example, by being affixed to the hangers, are provided. These members may contain information identifying the nature of the article that is hung from the hanger. Code member detecting means detect the coding members and provide a signal to the control circuit which is indicative of the information on the code members. The control means then selects an appropriate sprayer operation for the type of article detected.

BRIEF DESCRIPTION OF THE DRAWINGS

For the purpose of illustrating the invention, there is shown in the drawings an embodiment which is presently preferred, it being understood, however, that the invention is not limited to the precise arrangement and instrumentalities shown.

FIG. 3 is a system timing diagram of various signals generated by the system of FIG. 1;

FIG. 4 is a system timing diagram of various signals generated by the system of FIG. 2;

DETAILED DESCRIPTION OF THE DRAWINGS

Figure 1:
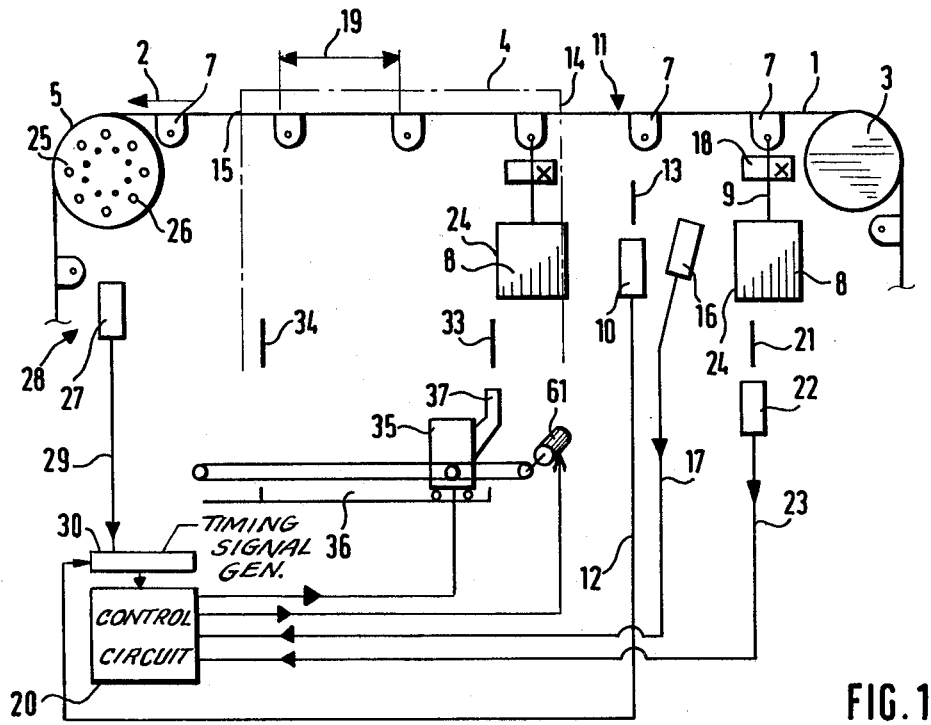
FIG. 1 is a schematic diagram of a spray-coating system in accordance with the invention there being no difference in the nominal and actual positions along the path of the conveyor of the articles to be sprayed.

Referring now to the drawings wherein like numerals indicate like elements, there is shown in FIG. 1 a continuous chain conveyor 1 which moves in the direction indicated by arrow 2 from a guide cogwheel 3 through a spray booth 4 and then over a driving cogwheel 5. While a chain conveyor is shown, a cable or roller type or any other suitable structure may also be used. Brackets 7 serve both as mounting elements for the hangers 9 and as position elements which are indicative of the length of individual sections of the chain. In the following description, the brackets 7 serve these dual purposes. If desired, however, brackets 7 can be used only to support hangers 9, and additional position elements, having a predetermined spacial relationship to brackets 7, can be used. Articles 8 to be coated are suspended from brackets 7 by hangers 9. A bracket sensor 10 generates a bracket position signal, preferably a pulse, on its output line 12 whenever a bracket 7 arrives at a predetermined bracket position 13 along the length of the path of conveyor 1 upstream of the entrance 14 to spray booth 4.

A detector 16, which is also upstream of the entrance 14 to the spray booth 4, generates an article identification signal at its output line 17 whenever it detects a code contained on the code plate 18 and providing information (e.g. size, shape, color to be sprayed, etc.) regarding the article 8 associated with the code plate. The article detection signal identifies the type of article 8 to be sprayed as a function of the information contained on code plate 18. The signal on output line 17 is supplied to a control circuit 20 which is preferably microprocessor based. The signal determines which of several spray control programs are used to control the spraying of articles 8, as will be described below.

An edge sensor 22 located at a starting point 21 upstream of the entrance 14 to booth 4 is also provided. Edge sensor 22 produces an edge-detection signal on its output line 23 whenever the front edge 24 of an article 8 arrives at starting point 21.

A perforated disk 25 is coupled to driving cogwheel 5 of conveyor 1. Disk 25 is perforated, for example, with an outer ring of 2000 openings or holes 26 that are detected by a detector 27. Perforated disk 25 works in conjunction with detector 27 as a conveyor movement pulse generating means 28 that produces pulses on its output line 29. These pulses are indicative of the linear speed of the conveyor 1 at the location of cogwheel 5 and are supplied to a timing signal generating circuit 30, one pulse being generated whenever one of the openings 26 arrives in the field of detector 27. Perforated disk 25 may rotate, for example, once for every one meter of travel of conveyor 1.

Presuming that the distance 19 between two successive brackets 7 is nominally twenty centimeters long, detector 27 will produce 400 pulses during the time it takes two consecutive brackets 7 to pass a stationary point (assuming that the conveyor 1 has not stretched). Timing signal generating circuit 30 (described below with reference to FIG. 5) counts the pulses from detector 27 and produces a timing signal each time a predetermined number of conveyor movement pulses are counted. These timing signals are supplied to control circuit 20 which utilizes them to control a sprayer 35 to coat articles 8. While any known control circuit may be used, one presently preferred embodiment is illustrated schematically in FIG. 6. As shown therein, control circuit 20 includes a shift register 202, a microprocessor 204, a spray rate control circuit 206 and a spray movement control circuit 208. Since each of these elements are individually known, they will not be described in detail herein.

In the embodiment illustrated, control circuit 20 controls the operation of sprayer 35 by initiating a spray-coating operation when the front edge of article 8 reaches the initial coating position 33 and varies the spray-coating operation in a predetermined manner until the front end of the article 8 reaches the final coating position 34 at which time the spray-coating operation is completed. During movement of the article 8 between positions 33 and 34, the control circuit 20 varies the amount of spray-coating material being sprayed and/or the position of sprayer 35 with respect to the article 8.

The amount of coating material to be sprayed is varied by spray rate control circuit 206 which receives appropriate control signals from microprocessor 204. One control circuit for carrying out this operation is disclosed in U.S. Pat. No. 4,357,900, whose disclosure is incorporated herein by reference. In accordance with the control circuit disclosed herein, microprocessor 204 memorizes a spray-coating sequence for the given article to be sprayed (the particular article to be sprayed being identified by the article identification signal generated by sensor 16) and applied appropriate control signals to spray rate control circuit 206. These signals will cause control circuit 206 to vary the amount of coating material sprayed as a function of the movement of article 8 through spray booth 4.

The movement of sprayer 35 is controlled by sprayer movement control circuit 208 which receives appropriate control signals from microprocessor 204 as the article 8 is moved between positions 33 and 34. The sprayer may be moved in unison with the article 8, may be moved faster than the article 8 or may be moved slower than the article 8. The sprayer may also be kept stationary. One suitable control circuit corresponding to control circuit 208 is disclosed in commonly assigned copending application Ser. No. 447,309, filed on Dec. 6, 1982, in the name of Karl Buschor, which disclosure is incorporated herein by reference.

Before microprocessor 204 can generate the appropriate control signals which are applied to circuits 206, 208, it must know when the front edge of article 8 has reached the initial coating position 33. To this end, shift register 202 receives the edge detection signal (indicating when the next article 8 to be coated has reached the starting point 21) from sensor 22 on its DATA input and receives a timing signal (indicative of the speed of the article 8) from timing signal generating circuit 30 on its COUNT input. As a result, a binary 1 will be placed in the first storage location of shift register 202 whenever the front edge 24 of a new article 8 reaches the starting position 21 and will be shifted through the shift register 202 at a rate determined by the timing signals generated by timing signal generating circuit 30. By utilizing a shift register whose length is equivalent to the number of timing pulses which need be generated for the front edge 24 of article 8 to move from the starting position 21 to the initial coating position 33, a binary "1" will appear at the output of shift register 202 whenever the front edge 24 of a new article 8 has reached the initial coating position 33. This signal is applied to microprocessor 204 which initiates a spray coating operation in response thereto. The frequency at which microprocessor 204 sequences through its various program steps, and therefore the manner in which the sprayer 35 is controlled at the article 8 moves between the positions 33 and 34, is also controlled by the timing signals generated by timing signal generating circuit 30.

As should be made clear by the foregoing, the proper operation of sprayer control circuit 20 is dependent upon the accuracy with which the timing signals generated by timing signal generating circuit 30 indicate the actual position of the article 8 as it moves between starting position 21 and the final coating position 34. If the timing signals do not reflect the actual movement of the article 8 between these points, spray control circuit 20 may initiate a spraying operation either too soon or too late or may vary the spraying operation (e.g. the amount of coating being sprayed or the movement of sprayer 35 or its spray gun 37) in a manner which is out of synchronism with the actual movement of article 8.

To ensure that the timing signals accurately reflect the position of the article 8 as it moves through the spray booth 4, timing signal generator 30 generates the timing signals as a function of both the conveyor movement pulses generated by pulse generating means 28 and the bracket position pulses generated by bracket sensor 10. To this end, timing signal generating circuit 30 counts the conveyor movement pulses from detector 27 and produces a timing signal each time a first predetermined number of conveyor movement pulses are counted until a second predetermined number of timing signals have been generated. Circuit 30 then generates a new timing signal and reinitiates its counting operation upon receipt of the next bracket position pulse.

In the example being considered, circuit 30 will generate a single timing signal each time it counts 40 conveyor movement pulses generated by sensor 27. Since there are 2,000 openings 26 in perforated disk 25, and perforated disk 25 completes one revolution each time conveyor 1 moves one meter along the direction of arrow 2, timing signal generator circuit 30 will generate a single timing signal each time conveyor 1 nominally moves two centimeters. Presuming that each bracket 7 is nominally separated by a distance 19 of, for example, 20 centimeters apart, timing signal generating circuit 30 will generate ten timing signals in the time it takes two successive brackets 7 to pass a stationary point (e.g. position 13).

Figure 2:
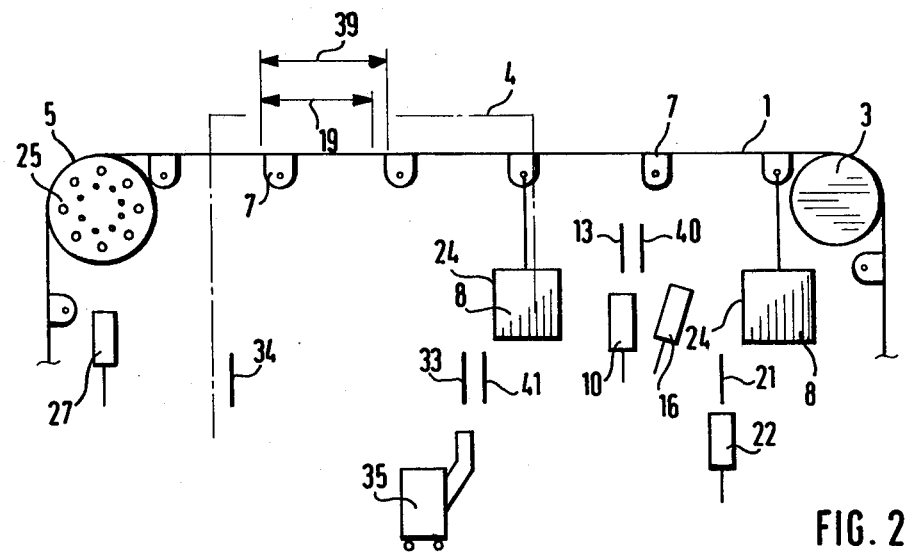
FIG. 2 is a diagram of a portion of the spray-coating system in FIG. 1 where the length of the conveyor has been altered as the result of extension or expansion, so that differences exist in the nominal and actual positions along the path of the conveyor of articles to be sprayed.

Assuming that there are no variations in the length of conveyor 1, the timing signals generated by timing signal generating circuit 30 will provide an accurate indication of the position of the article 8 as it moves through the spray booth 4. Due to variations in the weight load on conveyor 1, variations in the amount of coating material being placed on articles 8, and other variables, the conveyor 1 will often stretch causing the distance between two successive brackets 7 to increase from the nominal value. As shown in FIG. 2, the actual distance between two successive brackets 7 may stretch to a distance 39 from the nominal distance 19. As a result of this variation in the length of conveyor 1, the timing signals generated by timing signal generating circuit 30 will not, in the absence of some modification thereof, truly reflect the movement of an article 8 between the positions 21 and 34. In order to periodically modify the generation of the timing signals to truly reflect the position of the articles 8, timing signal generating circuit 30 also receives the bracket position signals generated by sensor 10. Since these signals provide information regarding variations in the length of individual sections of the conveyor 1, they can be used by timing signal generating circuit 30 to modify the phase of the timing signals generated thereby. Since the bracket position signals are generated at too low a frequency to permit accurate variations in the coating process as the article 8 is moved between positions 33 and 34, they cannot be used alone as inputs to control circuit 20. By using these signals, however, to periodically modify the phase of the high frequency timing signals generated by timing control circuit 30 in response to the conveyor movement pulses 27, the timing signals generated by circuit 30 both accurately reflect the actual movement of articles 8 and provide high resolution (i.e. high frequency) signals which can be advantageously utilized by spray control circuit 20.

Figure 5:
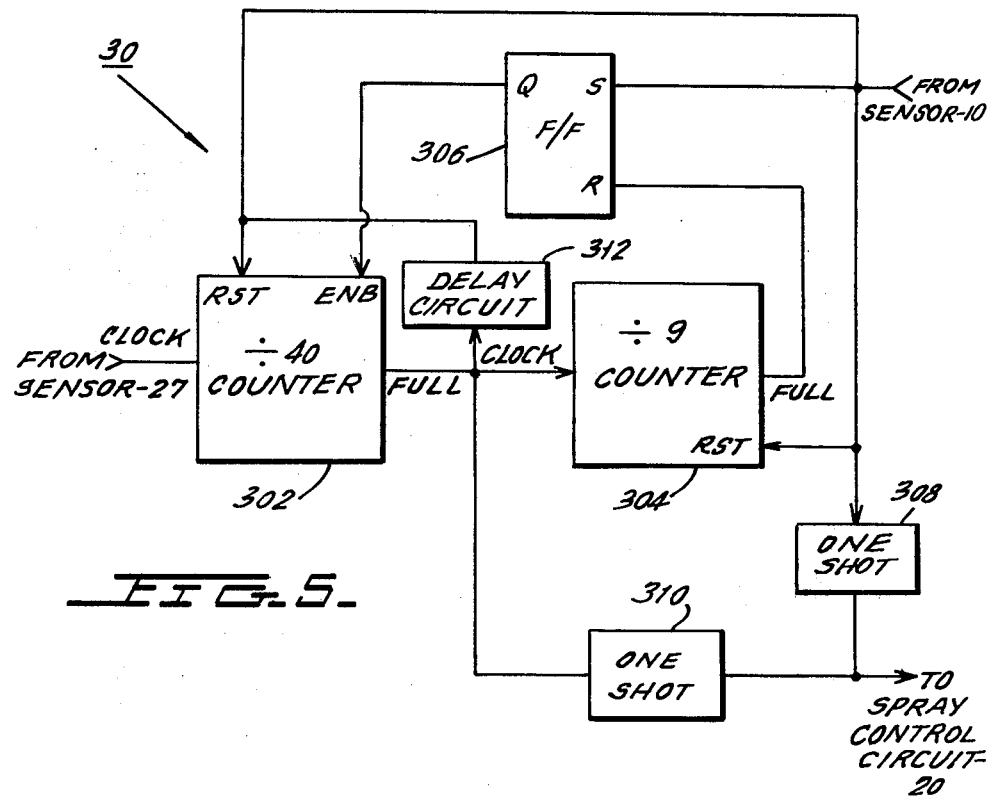
FIG. 5 is a block diagram of the control signal generating means of FIGS. 1 and 2.
Figure 6:
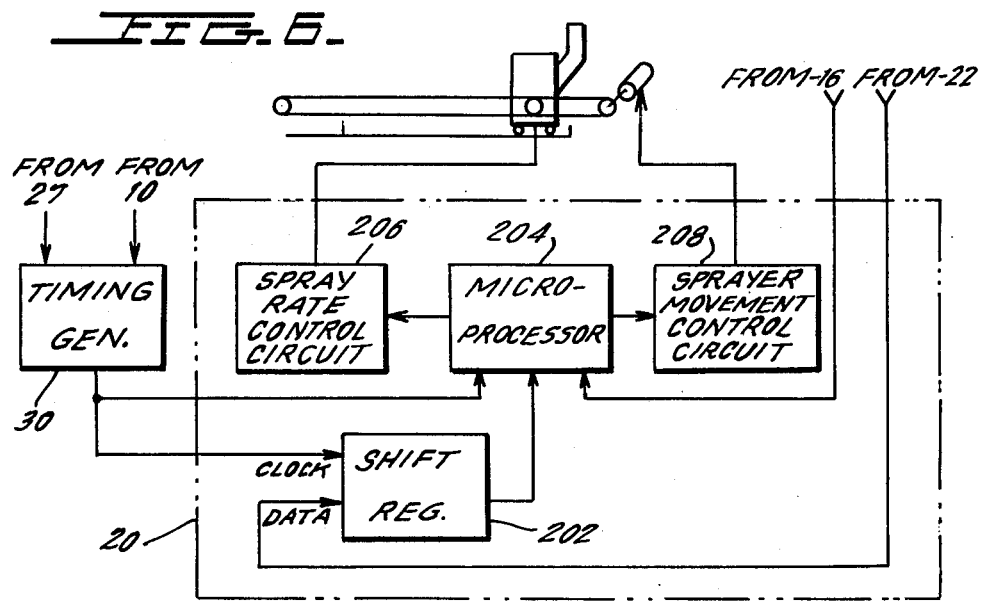
FIG. 6 is a block diagram of the control circuit of FIGS. 1 and 2.

One possible embodiment of timing signal generating circuit 30 is illustrated in FIG. 5. As shown therein, timing signal generating circuit 30 comprises a pair of counters 302, 304, a flip-flop 306, a pair of one-shots 308, 310 and a delay circuit 312.

Counter 302 is a divide-by-40 counter whose count is reset to zero whenever it receives a positive going pulse on its reset input RST. Since the reset input RST of counter 302 is connected to the output of bracket sensor 10, the counting counter 302 will be reset to zero whenever sensor 10 detects the presence of a bracket 7 at bracket position 13.

Once counter 302 has been reset to zero, its stored count will be increased by one each time it receives a positive going pulse on its CLOCK input. Since the CLOCK input of counter 302 is connected to the output of detector 27, this count will increase by one each time conveyor 1 nominally moves one milimeter. When the count in counter 302 reaches 40, it generates a binary 1 on its FULL output indicating that the conveyor 1 is nominally moved two centimeters. This signal is applied to the CLOCK input of counter 304, to one-shot 310 and to delay circuit 312. This signal causes one-shot 310 to generate a single timing signal, causes the count in counter 304 to increase by one and causes delay circuit 312 to reset the count in counter 302 to zero after a delay period which is shorter than the period of the pulses generated by sensor 27. At this point, counter 302 will count the pulses generated by sensor 27 so as to repeat the foregoing operation. Counter 302 will continue to operate in this manner as long as a binary 1 appears on its enable input ENB. Whenever a binary 0 appears on the enable input ENB of counter 302, counter 302 will be disabled.

Counter 304 is a divide-by-9 counter whose count is reset to zero each time a positive going pulse is applied to its reset input RST. Since the reset input RST of counter 304 is connected to the output of bracket detector 10, the count in counter 304 will be reset to zero each time a new bracket 7 reaches the bracket position 13.

Once the count in counter 304 has been set at zero, the count in counter 304 will increase by one each time it receives a positive going pulse on its CLOCK input. When the count in counter 304 reaches nine, its FULL output jumps to the binary 1 level. This signal is applied to the reset input R of flip-flop 306 causing the Q output of flip-flop 306 to toggle to the binary 0 level and thereby to disable counter 302. Counter 302 will continue to be disabled until sensor 10 detects the next bracket 7 in which time the positive going pulse generated by detector 10 will be applied to the set input S of flip-flop 306. This will cause the Q output of counter 302 to return to the binary 1 level and thereby enable counter 302. This signal also resets the count in both counters 302 and 304 so as to reinitiate operation of circuit 30. Finally, this signal is applied to one-shot 308 so as to cause the generation of another timing signal.

Summarizing the foregoing, counter 302 will cause one shot 310 to generate a timing signal each time it receives 40 pulses from sensor 27, or one timing signal for every two centimeters of nominal movement of conveyor 1. Counter 302 will continue to count pulses generated by sensor 27 until nine timing signals are generated. At that point, counter 302 is disabled until a bracket position pulse is generated by sensor 10. At that point, counter 302 will be re-enabled and the process will be repeated. In this manner, timing circuit 30 generates timing signals at a frequency corresponding to the speed of movement of conveyor 1 and adjusts the phase of these signals as a function of the actual distance between successive brackets 7 as detected by detector 10.

The foregoing operation of timing circuit 30 can best be understood with reference to FIGS. 3 and 4.

FIG. 3 illustrates the timing of various signals appearing in FIG. 5, and the position of successive brackets 7 when conveyor 1 is not stretched and each of the brackets 7 is exactly 20 centimeters apart. Line A of FIG. 3 illustrates the bracket position pulses generated by detector 10 and appearing on line 12. Line B illustrates the conveyor movement pulses generated by sensor 27. The numbers below the conveyor movement pulses indicate the instantaneous count in counter 302. Line C of FIG. 3 illustrates the timing signals generated by timing signal generator circuit 30. The numbers under the pulses indicate the count in counter 304. Line D provides a schematic illustration of the position of the brackets 7 in relationship to the signals of lines A–C. In order to illustrate all of the required signals for three successive brackets, lines A–C have been broken at appropriate locations. It will be apparent to those skilled in the art that additional signals appear in the broken areas of lines B and C.

As noted above, timing signal generator circuit 30 is reset upon the generation of each conveyor movement pulse (shown as pulses 12.1, 12.2 and 12.3 in line A). Upon receipt of one of these pulses, the count in counters 302 and 304 is reset to zero. Thereafter, count in counter 302 is increased by one at a frequency determined by the conveyor movement pulses shown in line B. When the count in counter 302 reaches 40, counter 302 generates a positive going pulse on its FULL output causing one-shot 310 to generate a single timing signal (see line C) and causing the count in counter 302 to be reset to zero (see line B). At the same time, the count in counter 304 is increased to one. Thereafter, the count in counter 302 is increased by one each time it receives an additional conveyor movement pulse until the count in counter 302 reaches 40. At that point, a positive going pulse appears at the FULL output of counter 302 causing one-shot 310 to generate a second timing signal (see line C) and causes the count in counter 302 to be reset to zero (see line B). The count in counter 304 increases to two (see line C) and the foregoing operation continues until the count in counter 304 reaches nine. At that point, a positive going pulse appearing at the FULL output of counter 304 causes flip-flop 306 to disable counter 302 such that the count in counter 302 remains at zero despite the receipt of additional conveyor movement pulses (see line B). Timing circuit 30 will be reset by the next bracket position pulse 12.1 (see line A) generated by sensor 10. The entire operation is then repeated as shown.

In the illustration set forth in FIG. 3, it is assumed that the actual spacing between successive brackets 7 is exactly twenty centimeters. As such, the spacing between the ninth and tenth timing signals is the same as that between the remaining timing signals. The manner in which timing circuit 30 adjusts this relationship in the event of a stretching or contraction of conveyor 1 is illustrated in FIG. 4.

Since the distance between two successive brackets rarely varies by more than 10%, the operation of timing signal generator circuit 30 during the generation of the first nine timing signals is normally identical to that illustrated in FIG. 3. In the example illustrated in FIG. 4, it is assumed that the distance between bracket 7.1 and 7.2 has increased (the nominal position of bracket 7.2 being illustrated in phantom). As a result, the count in counter 302 remains at the zero level for a time period greater than 40 conveyor movement pulses so as to cause the phase of the tenth timing signal to be delayed with respect to the first nine timing signals. Once the bracket position signal 12.2 (see line A) has caused the generation of the tenth timing pulse (see line C), timing signal generator circuit 30 repeats its standard operation and generates nine successive timing signals at a frequency determined by the conveyor movement pulses generated by sensor 27. In the example illustrated, it is assumed that the distance between successive brackets 7.2 and 7.3 has decreased from the nominal distance (the nominal position of bracket 7.3 being shown in phantom). Accordingly, the count in counter 302 will be reset by the bracket position pulse 12.3 before the generation of 40 conveyor movement pulses. This effectively shifts the phase of the timing signals to the left as shown. See line C of FIG. 4.

In the foregoing examples, it is assumed that the spacing between successive brackets 7 never decreases by more than 10%. It should be apparent to one skilled in the art, however, that if a larger decrease does occur, this will merely cause the phase of the timing signals to be adjusted before nine full timing signals are generated and will reset the operation of timing circuit 30 at that point.

In the foregoing description, each of the elements of timing circuit 30 are hardware elements. It should be apparent to one of ordinary skill in the art that the identical function can be carried out by providing an appropriate software program to a microprocessor. Accordingly, such a modification of the described embodiment falls fully within applicant's invention.

The present invention may be embodied in other specific forms without departing from the spirit or essential attributes thereof and accordingly, reference should be made to the appended claims, rather than to the foregoing specification as indicating the scope of the invention.

What is claimed is:

1. A spray coating control system for controlling the operation of a sprayer in synchronism with the movement of an article to be sprayed through a spray-coating region by a conveyor, said control system comprising:
   (a) means for generating conveyor movement pulses having a frequency representative of the speed of said conveyor, and therefore the speed of said article, as it moves through said spray-coating region;
   (b) a plurality of detectable elements located at spaced locations along said conveyor;
   (c) element detection means for generating an element position signal each time one of said elements passes a predetermined location, whereby said element position signals provide information regarding the relative lengths of subsections of said conveyor, the location of said elements being such that the frequency of said element position signals is less than the frequency of said conveyor movement pulses;
   (d) timing signal generating means for generating timing signals at a frequency determined by said conveyor movement pulses and for periodically adjusting the phase of said timing signals as a function of said element position signals; and
   (e) means for controlling the operation of said sprayer as said article is moved through said spray-coating region as a function of said timing signals.

2. The spray coating control system of claim 1, wherein said means for generating conveyor movement pulses comprises means for detecting the linear speed of said conveyor at a first point remote from said spray-coating region and for generating conveyor movement pulses representative thereof.

3. The spray coating control system of claim 2, wherein said detecting means detects the speed of said conveyor at a point downstream from said spray-coating region.

4. The spray coating control system of claim 1, wherein said detectable elements are equally spaced when said conveyor is in a non-stretch state.

5. The spray coating control system of claim 4, wherein said detectable elements comprise a plurality of hanger brackets, each of said hanger brackets being adapted to support an article to be sprayed via a respective hanger.

6. The spray coating control system of claim 1, wherein said timing signal generator means comprises:
   first means for generating a timing signal each time said timing signal generator means receives a first predetermined number of conveyor movement pulses; and
   second means for disabling said first means after said first means has generated a second predetermined number of timing signals, said disabling means re-enabling said first means upon receipt of an element position signal.

7. The spray coating control system of claim 1, wherein said means for controlling the operation of said sprayer controls the amount of spray coating sprayed by said sprayer.

8. The spray coating control system of claim 1, wherein said means for controlling the operation of said sprayer controls the movement of said sprayer as said article is moved though said spray-coating region.

9. The spray coating control system of claim 1, wherein said predetermined location is upstream of said spray-coating region.

10. A method for controlling the operation of a sprayer in synchronism with the movement of an article to be sprayed through a spray-coating region by a conveyor, said conveyor having a plurality of detectable elements located at spaced locations along said conveyor, said method comprising the steps of:
   (a) generating conveyor movement pulses having a frequency representative of the speed of said conveyor, and therefore the speed of said article, as it moves through said spray-coating region;
   (b) generating an element position signal each time one of said elements passes a predetermined location, whereby said element position signals provide information regarding the relative lengths of subsections of said conveyor, the location of said element being such that the frequency of said element position signals is less than the frequency of said conveyor movement pulses;
   (c) generating timing signals at a frequency determined by said conveyor movement pulses and periodically adjusting the phase of said timing signals as a function of said element position signals; and
   (d) controlling the operation of said sprayer as said article is moved through said spray-coating region as a function of said timing signals.

11. The method of claim 10, wherein said conveyor movement pulses are generating by detecting a linear speed of said conveyor at a first point remote from said spray-coating region.

12. The method of claim 11, wherein said first point is downstream of said spray-coating region.

13. The method of claim 9, wherein said detectable elements are equally spaced when said conveyor is in a non-stretched state.

14. The method of claim 9 wherein said step of generating said timing signals comprises the steps of:
   generating a timing signal each time a first predetermined number of conveyor movement pulses has been generated until a second predetermined number of timing signals have been generated; and
   repeating said first step in response to the generation of an element position signal.

15. The method of claim 9, wherein said step of controlling the operation of said sprayer comprises the step of controlling the amount of spray coating sprayed by said sprayer.

16. The method of claim 1, wherein said step of controlling the operation of said sprayer comprises the step of controlling the movement of said sprayer as said article is moved through said spray-coating region.

17. The method of claim 9, wherein said predetermined location is upstream of said spray-coating region.

* * * * *